UNITED STATES PATENT OFFICE.

KARL HEINRICH DANGLER, OF STEUBENVILLE, OHIO.

COMPOSITION FOR FIRE-BRICK.

SPECIFICATION forming part of Letters Patent No. 572,969, dated December 15, 1896.

Application filed February 10, 1896. Serial No. 578,786. (No specimens.)

*To all whom it may concern:*

Be it known that I, KARL HEINRICH DANGLER, a citizen of the United States of America, residing at Steubenville, in the county of Jefferson and State of Ohio, have invented certain new and useful Improvements in Composition for Fire-Bricks, of which the following is a specification.

This invention relates to a certain new and useful composition to be used for making fire-clay bricks, and has for its object to construct a brick that will be much more strong and durable than the ordinary fire-bricks and that will be particularly useful in the building of furnaces and the like.

My composition consists in the following ingredients, mixed together in the proportions as follows: six hundred parts clay, three hundred parts ground white sandstone, forty parts crystal sand, twenty-five parts fluor-spar, and thirty-five parts calc-spar. These ingredients are to be thoroughly mixed together, and when this operation is completed the substance can be molded to any style or shape desired.

By the use of this composition for building furnaces and the like it will be found particularly useful for forming flues through the walls, according as it may be desired and as may be arranged for by constructing the molds to form the apertures through the bricks.

The composition will be found to withstand a much greater degree of heat than the ordinary fire-bricks and can be manufactured equally as cheap, thereby securing considerable economy in the construction of a furnace or the like.

Having fully described my invention, what I claim as new, and desire to secure by Letters Patent of the United States, is—

A composition for fire-bricks and the like, consisting of six hundred parts clay, three hundred parts ground white sandstone, forty parts crystal sand, twenty-five parts fluor-spar, and thirty-five parts calc-spar, as specified.

In testimony whereof I affix my signature in presence of two witnesses.

KARL HEINRICH DANGLER.

Witnesses:
J. L. BRAUN,
F. ANTON WEISKE.